United States Patent [19]

van Hesden

[11] 4,046,524

[45] Sept. 6, 1977

[54] LAPPING COMPOSITIONS COMPRISING AN ALUMINUM, DIALKYL ORTHOPHOSPHATE GELLING AGENT

[75] Inventor: Jan Willem van Hesden, Baulkham Hills, Australia

[73] Assignee: Borg-Warner Corporation, Chicago, Ill.

[21] Appl. No.: 629,340

[22] Filed: Nov. 6, 1975

[51] Int. Cl.² .......................... C09K 3/14; C10M 1/46
[52] U.S. Cl. ...................................... 51/306; 252/32.5
[58] Field of Search .......................... 51/306, 302–305; 106/11, 8, 3; 252/32.5

[56] References Cited

U.S. PATENT DOCUMENTS

| | | | |
|---|---|---|---|
| 2,944,880 | 7/1960 | Allen et al. ............................ | 51/304 |
| 3,458,300 | 7/1969 | Duvall et al. ............................ | 106/3 |
| 3,562,176 | 2/1971 | Stancioff et al. ........................ | 51/302 |
| 3,575,859 | 4/1971 | Monroe ................................. | 252/32.5 |
| 3,757,864 | 9/1973 | Crawford et al. ............... | 252/8.55 R |
| 3,909,217 | 9/1975 | Perry ..................................... | 51/306 |

Primary Examiner—Donald J. Arnold
Attorney, Agent, or Firm—Richard J. Schlott

[57] ABSTRACT

An improved lapping composition for use in lapping the surfaces of parts such as gears, seals, rings, and the like comprises a hydrocarbon liquid which is gelled by the addition of an alkyl orthophosphate gelling agent and to which is added the abrasive grit. The thixotropic character of the composition provides greatly improved suspension of the abrasive grit and highly desirable flow characteristics under shear, and results in an unexpected improvement in lapping rates.

7 Claims, No Drawings

LAPPING COMPOSITIONS COMPRISING AN ALUMINUM, DIALKYL ORTHOPHOSPHATE GELLING AGENT

Background of the Invention

This invention relates to an improved vehicle compounded with abrasive grit for use in lapping operations and to a method for improving metal lapping operations. More particularly, this invention relates to an improved lapping composition consisting of an abrasive grit and a vehicle which comprises a hydrocarbon liquid and a gelling additive which has an enhanced ability to suspend abrasive grits, and to an improved lapping process.

Lapping is a low-speed, low-pressure abrading operation used in finishing metal parts to accomplish correction of minor imperfections in shape and/or refinement of the surface finish. Lapping is widely used, for example, in gear finishing to correct heat-treatment distortion errors, and for finishing flat surfaces of parts to achieve improved flatness and finish. Lapping is accomplished by rubbing the abrasive against the workpiece with a lap. Although in some operations the lap will have the abrasive bonded thereto, free abrasive lapping wherein the particulate abrasive is fed to the face of the lap is widely practiced. In free abrasive lapping operations, the particulate abrasive material is carried in a vehicle which suspends and carries the abrasive and lubricates or cushions the interface between the lap and the workpiece to minimize metal-to-metal contact. Oil-based vehicles are widely employed for these purposes, and may be such liquids as kerosene, diesel fuel, mineral seal oil, spindle oil and the like. For some purposes, heavy oils and greases are used, and commercial compositions employing mixtures of animal fats, vegetable and mineral oils are widely available.

In most lapping operations a mixture of the vehicle and the particulate abrasive or grit is continuously fed to the surface of the lap at a predetermined rate, collected in a sump area beneath the lap, and recirculated by pumping means. It will be apparent that uniform dispersion of the grit in the vehicle is desirable to accomplish a controlled, uniform feeding to the lap. In order to maintain a uniform dispersion, the reservoir containing the vehicle and grit mixture is normally agitated by stirring or similar means to prevent the grit from settling to the bottom. Similarly, where the grit and vehicle mixture is collected in a separate sump it is necessary that agitation and/or rapid removal of the mixture be accomplished in order to prevent settling and accumulation of grit in the sump area. While employing more viscous vehicles would tend to retard settling, highly viscous fluids are unsuited to most lapping operations and additionally are more difficult to mix and transport, requiring larger pumps and a more powerful stirring or mixing apparatus.

An improved vehicle composition having the ability which maintains the grit in suspension at the working viscosity either without agitation or with minimal stirring and which can be prepared to have any desired working viscosity within a wide range would clearly be a desirable advance in the art.

SUMMARY OF THE INVENTION

It has now been found that hydrocarbon liquids gelled with particular gelling agents are highly useful vehicles for use in lapping operations. More particularly, hydrocarbon liquids including kerosene, diesel fuel and light oils which have been gelled with particular pseudo double salts of alkyl orthophosphoric acids have significantly increased low-shear viscosity, suspend abrasive grit for long periods even while quiescent, and exhibit the properties of low viscosity fluids while under conditions of high shear to permit rapid transport of grit to the lap surface. When compounded with abrasive grit, the resulting gelled compositions provide an unexpected improvement in lapping and particularly in gear lapping operations by way of unpredicted enhancement of the rate of metal removal and a concomitant decrease in the time required for the lapping cycle.

DETAILED DESCRIPTION

The gelled lapping compositions of this invention comprise a liquid hydrocarbon gelled by the addition of from about 0.1% to about 10% by weight of the liquid hydrocarbon of a pseudo double salt of an alkyl orthophosphoric acid as a gelling agent, and a particulate lapping abrasive grit. The physical characteristics of these gelled compositions distinguish them from merely thickened solutions which have increased viscosities resulting from dissolved solute. Gel consistency will be thinned upon dilution, but the gel structure will not be lost. At very high dilutions, the gel consistency may not be visually apparent and the presence of gel structure will be detected only by measurement of bulk physical properties of the system.

The liquid hydrocarbons useful for the purposes of this invention are the liquid petroleum hydrocarbons capable of being gelled by the particular alkyl orthophosphate gelling agents employed, including kerosene, diesel fuel, light mineral oils, spindle and the like. While light petroleum fractions including gasoline, naphtha and the like may also be employed, their volitility and flammability make them hazardous and therefore less desirable for most lapping purposes. High viscosity oils and greases may also be gelled, but for most applications these will be too viscous to be of practical value. The preferred liquid hydrocarbons will have a flash point above about 100° F. and a viscosity of less than about 200 cps. [Brookfield viscometer, No. 2 spindle 50RPM].

The gelling agents useful for the practice of this invention are broadly described as pseudo double salts of alkyl orthophosphoric acids. These pseudo double salts are disclosed and described in pending U.S. patent application, Ser. No. 606,264, filed Aug. 20, 1975. In general, the pseudo double salt gelling agents are obtained by neutralizing an acidic, non-stoichiometric aluminum salt of an alkyl orthophosphoric acid with a second inorganic base. The acidic non-stoichiometric aluminum salt precursors are the product of the reaction of less than a stoichiometric amount of a basic aluminum compound such as hydrated alumina with an alkyl ester of orthophosphoric acid. More particularly, an alkyl ester of orthophosphoric acid is first prepared by reacting an equimolar mixture of two or more aliphatic alcohols such as butyl alcohol and decyl alcohol with phosphorus pentoxide to give a mixture of monoalkyl and dialkyl orthophosphoric acids. This mixture is then further reacted with from 20% to 70% of the stoichiometric amount [based on acidic hydrogens in the orthophosphoric acid] of an aluminum compound such as hydrated alumina, aluminum isopropoxide or the like. The pseudo double salt gelling agent is then formed in situ by dispersing or dissolving the non-stoichiometric product in the liquid hydrocarbon and neutralizing the remaining acidity by adding a second base such as sodium hydroxide, sodium hydroxide, sodium carbonate, trisodium phosphate, calcium oxide or the like to give a gel. The second base may be added in solid form, or where soluble, in aqueous solution. The non-stoichiometric aluminum salts do not give gels until subsequently neutralized by adding the base, and thus are not in themselves gelling agents.

The amount of gelling additive will in part determine the thickness of the gel produced, and at concentrations below about 0.1% by weight the gels are thin and relatively non-viscous. At higher concentrations the gels become increasingly viscous and non-flowing under low shear stresses. The viscosity and gel character also depends in part upon the particular hydrocarbon employed and upon the particular gelling agent as defined both by the alkyl substituents on the orthophosphoric acid, and upon the degree of precision with which neutralization is accomplished. Useful viscosity and suspending characteristics will result only in the range of from about 0.1% to about 10.0% by weight of gelling agent and the concentration may be varied within these limits to suit particular application's purposes. Below this range, the grit-suspending character of the resulting vehicle will be inadequate, and above this range the liquid will not flow adequately to give good lapping. It will be further understood that the grit-suspending ability of the gel will depend in part upon the character of the grit, and the optimum gel concentration will thus be determined in part by the particular grit to be employed.

The particulate lapping abrasive or grit employed may be any of the abrasives conventionally employed in lapping operations, including silicon carbide, corundum, alumina, garnet, emery, chromic oxide, ferric oxide, cerium oxide, diamond and the like in grit sizes of from No. 20 to No. 3800 and in certain polishing applications, as low as 1.0 micron. The specific grit and grit size selected is determined by the particular lapping operation to be undertaken. The proportion of grit and vehicle may be varied over a wide range depending upon the part being finished and the type of finishing undertaken. In general, the amount of grit employed will lie in the range of from about 0.1 lb. to about 20 lbs. of grit per gallon of vehicle. A particular advantage of the gelled vehicle employed for the purpose of this invention lies in the ability of the vehicle to uniformly suspend high levels of grit with a minimum of settling and without requiring high speed agitation to maintain the grit dispersion, where non-gelled vehicles, even when of equivalent low shear viscosity, allow settling-out of the abrasive grit.

In general, the lapping composition will be prepared by first combining the liquid hydrocarbon with the gelling agent to form the gelled vehicle. As set forth above, the normal procedure will be to combine the liquid hydrocarbon with the requisite amount of acidic, non-stoichiometric aluminum salt, then to neutralize with a second base to form the gel. The acidic, non-stoichiometric aluminum salts disperse readily in hydrocarbons with low shear mixing, however, high speed agitation during the neutralization step is desirable to ensure rapid mixing and uniform gel formation. It is also possible to prepare concentrates of pseudo double salt gelling agent in a suitable liquid hydrocarbon such as diesel fuel. These concentrates, when added in appropriate amounts to a liquid hydrocarbon and subjected to a high shear mixing operation will be further diluted to form the gelled vehicle.

The desired amount of the lapping abrasive grit is then added to the gelled vehicle with stirring to achieve a uniform dispersion of grit in the vehicle. The resulting composition is then ready for use, or it may be stored in drums for later use. Settling of the grit is a problem with most ungelled vehicles, but with the gelled vehicles of this invention little settling occurs even on long storing, and gentle agitation just prior to use is normally sufficient to ensure that the dispersion is uniform. Where large grit sizes are employed, and in compositions containing very high grit loadings, settling is more likely to occur, and it may be desirable to provide more extensive agitation.

The invention will be more readily understood by consideration of the following examples, wherein the preparation of specific gelling agents, the forming of specific gelled vehicles and lapping compositions and the use in lapping operations is illustrated.

THE GELLING AGENTS

Example 1

An alkyl acid orthophosphate was prepared by reacting 53.8 grams of $P_2O_5$ with a mixture of 30.2 grams of butyl alcohol and 100 g. of a commercial mixture of n-octyl, n-hexyl and n-decyl alcohols in the absence of a solvent. The one hundred grams of butyl octyl acid orthophosphate resulting from this reaction were reacted with 5.2 grams of hydrated $Al_2O_3$ (30% of theory) by heating the mixture at 110° C. for approximately one hour. The water was evaporated off and the resultant partial aluminum salt was cooled. The partial aluminum salt was a viscous oil.

Example 2

One hundred grams of butyl octyl acid orthophosphate prepared in Example 1 were reacted with 9.4 grams of hydrated alumina (50% of stoichiometry) instead of 6.2 grams as set forth in Example 1 above. This partial aluminum salt was a highly viscous grease.

Example 3

One hundred grams of a dialkyl acid orthophosphate were prepared from butyl alcohol, a commercial mixture of $C_{12}$–$C_{22}$ normal alkanols and $P_2O_5$ in the same manner as employed in the preparation of butyl octyl acid orthophosphate in Example 1. This product was then further reacted with hydrated alumina to give a partial aluminum salt having 40% of a stoichiometric amount of aluminum in the product. This partial aluminum salt was a viscous oil.

Example 4

Two grams of the non-stoichiometric aluminum salt of Example 1 were added to 250 ml. of diesel fuel. The salt dispersed rapidly in the diesel fuel upon stirring at room temperature. No change in viscosity was noted.

Five drops of 30% aqueous sodium hydroxide were added to the mixture with high speed stirring to give a gelled hydrocarbon neutral to methyl red indicator. The gel was highly viscous, and registered a viscosity of 3200 cps. on a Brookfield viscometer at 10RPM, No. 2 spindle, at room temperature (23° C.).

The gelling agent concentration in Example 4 is approximately 1% by weight. While this vehicle may be used without further dilution for many lapping operations, more dilute gels will normally be preferred both by reason of lower viscosity and for economic reasons. Gels having lower concentrations of the gelling agents may be prepared directly by employing lower quantities of partial aluminum salt in the procedure of Example 4, or 1% by weight gel may be further diluted by addition of a liquid hydrocarbon while stirring.

While the Examples given are based on particular esters of orthophosphoric acid, a wide variety of alkyl esters may be similar employed. Methods for preparing gels from these alternative systems are set forth in pending U.S. patent application, Ser. No. 606,264, filed Aug. 20, 1975.

THE LAPPING COMPOSITIONS

Example 5

A gelled hydrocarbon (50 gal) was prepared following the procedure of Example 4, but employing a final gelling agent concentration of 0.4 wt. %, using the gelling agent of Example 1. The gelled hydrocarbon vehicle had a viscosity of 180 cps., measured as before.

A total of 150 lbs. of No. 40 aluminum oxide grit were then added to the gelled vehicle while stirring, and stirring was maintained for about 2 min. to ensure thorough dispersion of the grit. After standing several hours without stirring, no visible settling of the grit was noted. A similar dispersion, prepared in diesel fuel but without the gelling agent, exhibited complete settling and separation of the grit within 10 minutes.

Example 6

A gelled hydrocarbon (50 gal.) was prepared by employing the gelling agent of Example 1 at a concentration of 0.5 wt. % in kerosene, following the procedure of Example 4. The viscosity of the gelled vehicle was measured with a standard Ford Cup No. 4; time to amass the initial 50 cc. was 51.2 seconds. A total of 415 lbs. of No. 280 silicon carbide grit was then added to the gelled vehicle with stirring. No settling of the grit was noted after standing for five days.

Comparative lapping tests were run employing gelled lapping compositions prepared as in Example 5. For control purposes, equivalent mixtures of grit and diesel fuel were also prepared and employed in lapping tests. The ungelled mixtures exhibited rapid settling of grit and the dispersion of grit in the ungelled vehicle could only be maintained by continuously stirring the mixture during the lapping tests.

The lapping tests were run using 1 in. high by 2¼ in. diameter cylinders of No. 52100 hot-rolled steel having machined faces. The parts were placed on an 18 inch diameter lap turning at 180RPM. The lapping composition was placed in a pot and continuously stirred while being gravity fed through an orifice to the lap at a rate of 390±10 g. of grit per hour. Lapping was continued for one or two hours. The parts were then cleaned, dried and weighed to determine weight loss. The average weight loss in grams was taken as a measure of metal removal, normalized to a two hour lapping period. The abrasive was 30 micron alumina.

TABLE I

| | | LAPPING TESTS | | | |
|---|---|---|---|---|---|
| Example | Liquid | Gelling[1] Agent | Grit #/Gal. | Average Weight Loss, g. | Suspendability[3] |
| 7 | #1 Diesel Fuel | | | | |
| Control 8 | Speed Fam[4] #210 | None | 3 | 1.086 | Very Poor |
| Control 9 | #1 Diesel Fuel | None | 3 | 1.20 | Very Poor |
| 10 | #1 Diesel Fuel | Ex. 1 | 3 | 1.314 | Good |
| 11 | #1 Diesel Fuel | Ex. 1 | 6 | 1.096 | Good |
| | | Ex. 3 | 3 | 1.10 | Good |

Notes:
[1]Partial aluminum salt precursors from Example indicated. Concentration 0.4% by weight.
[2]Weight loss after lapping operation; Average of five samples, normalized to 2 hours.
[3]Visual test for grit settling, see Example 5.
[4]Commercial non-gelled lapping vehicle from Speed Fam Corporation.

Example 12

The media tank of a lapping machine having a 36 in. lap was charged with 4 gallons of the lapping composition prepared in Example 5. Seal rings were placed on the lap and the vehicle-abrasive composition was fed to the lap face at approximately 0.5 gal/hr by pumping from the media tank to the feed trough. The parts were lapped for 8 minutes at a lap speed of 60 RPM, with a loading of 3 pounds per square inch of surface area. The parts had an RMS surface flatness to within 15–30 millionths of an inch.

Attempts to accomplish lapping of the parts using a non-gelled commercial lapping oil having a viscosity of 20 cps. [Brookfield No. 2 spindle, 50RPM] similarly mixed with No. 40 aluminum oxide grit at 3 lbs/gal were unsuccessful. The suspension could not be maintained in the media tank with strong agitation, and when pumped to the feed trough, separated to deposit grit in the trough, impeding flow of vehicle and grit to the lap.

By contrast, the gelled vehicle composition flowed smoothly to the trough and onto the lap, and was readily carried across the lap by centrifugal forces during the lapping operation.

It will be apparent that the gelled compositions employed in Examples 9–11 of Table I and in Example 12 are particularly advantageous for use in lapping operations by virtue of their ability to suspend grit without loss of necessary flow characteristics.

For comparison purposes, the following gelled compositions were prepared using the fully stoichiometric aluminum dialkyl orthophosphate gelling agents disclosed in U.S. Pat. No. 3,757,864.

Example 13

One hundred grams of butyl octyl acid orthophosphate prepared as in Example 1 were reacted with 18.7 g. of hydrated alumina (100% of stoichiometry) by dispersing the mixture in 500 ml. of toluene and heating at reflux for about 1 hour. The solvent and water were then evaporated to give a waxy solid. The waxy solid stoichiometric aluminum salt was dispersed in 250 ml. of diesel fuel at a concentration of 0.49 by heating to 100° C. and stirring for several days. The mixture had a viscosity of 250 cps. at 23° C. after standing for three days. The gel was combined with No. 40 aluminum oxide grit at a concentration of 3 lbs/gal as in Example 4, and employed in lapping test as for Examples 7–11. Although suspendability of grit in this composition was good, average wt. loss in grams on a 2 hour basis amounted to only 0.692 g., while a control run employing an ungelled mixture had a weight loss of 1.012 g. on a 2 hr. basis.

Example 14

A gelled vehicle was prepared by dispersing butyl octyl phosphoric acid into 5 gal. of diesel fuel to give a total concentration of 0.4 wt. %, then neutralizing with sodium aluminate by dropwise addition of a 38% aqueous solution to the mixture while under high shear stirring, following the method described in U.S. Pat. No. 3,757,864. The resulting gel was stabilized by adding 0.2 wt. % succinic anhydride and then mixed with 15 lbs. of No. 40 aluminum oxide grit and stirred to give a uniform suspension which did not settle on standing.

The gelled composition was employed in lapping tests as described for Examples 7-11. Suspendability was again good, and the average wt. loss in grams on a 2 hour basis amounted to 1.156 g. and 1.000 g. in two runs. A control ungelled mixture gave a wt. loss of 1.012 g. on a 2 hour basis.

Thus it will be apparent that gellation of the vehicle provides a useful suspension of the abrasive grit and materially increases lapping performance of the resulting lapping compositions in most instances. The improved lapping performance of the compositions of the present invention are thus unexpected and provide an unpredicted benefit over prior art ungelled lapping compositions.

Gear lapping, particularly of ring and pinion gears for automotive applications, is accomplished by running the gears being lapped together and interposing the abrasive between the engaging surfaces. The abrasive is normally suspended in a lubricating oil and fed into the mesh by pumping the slurry to the work. In the following Example, the gelled vehicle and abrasive composition prepared as in Example 6 was employed as the lapping composition in a Gleason 503 bevel gear lapping machine to obtain lapped ring and pinion gear sets.

Example 15

Twelve gallons of the gelled vehicle containing No. 280 silicon carbide grit prepared in Example 6 were charged to the resevoir of a Gleason type 503 gear lapping machine. Twenty ring and pinion gear sets were then lapped. The first six sets were lapped 1 minute forward and 1 minute reversed for a total of two minutes. The second nine sets were lapped 1.5 to 1.75 minutes in each direction, while the last five sets were lapped 2 minutes in each direction. Sets 3-20 were found to have acceptable finishes as determined by visual inspection. Set 3 was installed in a Ford Falcon and determined to be commercially acceptable in road tests under wet weather conditions.

By way of comparision, a napthenic base stock oil having a viscosity to 600 SUS at 100° F. is employed in production runs as the lapping vehicle. This oil is thickened by adding calcium stearate at a level which will produce a vehicle having a Ford Cup No. 4 viscosity of 47-52 sec. at 77° F., then mixed with No. 280 silicon carbide grit as before. The mixture was charged to the gear lapping machine and run in using a ring and pinion gear set for approximately 10 minutes. This merely thickened but ungelled mixture was difficult to handle, requiring high pump pressures to maintain flow to the work. The mixture was then used to lap ring and pinion gear sets as before. Acceptable finishes are obtained only after lapping for a total of 7 minutes with this non-gelled lapping composition.

Thus, it will be seen that lapping operations are greatly benefited in practice by use of the gelled vehicle-abrasive compositions of this invention. The uniformity of the composition and the thixotropic flow characteristics permit controlled flow of abrasive grit to the work. The gel consistency aids in maintaining complete suspension of grit over a wide ratio of grit to vehicle, and the unique high flow under shear of these thixotropic gels permits rapid flow of the abrasive grit and lapping vehicle to and through the lapping area without high pumping pressures. The lapping cycle is considerably shortened, permitting higher production rates. By contrast the more viscous, non-gelled thickened liquids which are employed as lapping vehicles in the prior art have very poor grit suspending ability, which permits settling out of the grit, and do not exhibit thixotropic properties of high flow under shear, thereby slowing the flow of the grit and vehicle to and through the lapping area, and requiring high pumping pressures to maintain acceptable flow rates.

While the gelled vehicle and abrasive grit compositions have been shown in a variety of flat lapping and gear lapping applications to produce improved surface finish for parts and gears, it will be understood that the compositions of this invention may be employed in other metal finishing operations which employ lapping methods, including polishing operations and the like. Similarly, in the finishing of non-metallic surfaces such as the surfaces of glass and ceramic parts, surfacing operations which employ abrasive grits and polishing grits and rouges suspended in vehicles are widely used. The gelled vehicle and abrasive grit compositions of this invention may have application with these materials as well, when optially formulated for the particular materials and devices employed for those purposes.

The instant invention will thus be seen to be a composition useful in lapping operations comprising a hydrocarbon liquid gelled with an aluminum dialkyl orthophosphate gelling agent, and an abrasive grit. The instant compositions exhibit unusual ability to suspend grit uniformly and possess a unique thixotropic behavior which together enhance the rate at which lapping and finishing operations are accomplished.

It will be apparent to one skilled in the art that further useful modifications may be made including for example the addition of corrosion inhibitors and the like without departing from the spirit of the invention. The invention has been set forth by means of specific examples which have been provided by way of illustration and not limitation and the scope of the invention is limited solely by the appended claims.

I claim:

1. A gelled hydrocarbon composition for use in lapping operations comprising a liquid hydrocarbon having a Brookfield viscosity of less than about 200 cps and a flash point above about 100° F, from about 0.1 to about 10% by weight based on liquid hydrocarbon of the pseudo double salt of an alkyl orthophosphoric acid as a gelling agent, said pseudo double salt being the product of the neutralization of an acidic non-stoichiometric aluminum salt of an alkyl orthophosphoric acid with a base selected from the group consisting of ammonia and basic compounds of alkali metals and alkaline earth metals, and from about 0.1 to about 20 lbs. of a lapping abrasive per gallon of liquid hydrocarbon.

2. The gelled hydrocarbon composition of claim 1 wherein the pseudo double salt of an alkyl orthophosphoric acid is the product of the neutralization of an acidic non-stoichiometric aluminum salt of an alkyl orthophosphoric acid with sodium hydroxide.

3. In a lapping operation wherein the surfaces of parts are subjected to low pressure abrading by contacting the part surface with a lapping surface and feeding to the contacting surfaces a lapping composition comprising a liquid hydrocarbon and an abrasive grit, the improvement wherein the lapping composition is gelled by adding thereto from about 0.1 to about 10 wt. percent based on liquid hydrocarbon of the pseudo double salt of an alkyl orthophosphoric acid as a gelling agent.

4. The lapping operation set forth in claim 3 wherein the pseudo double salt of alkyl orthophosphoric acid is the product of the neutralization of an acidic non-stoichiometric aluminum salt of alkyl orthophosphoric acid with a base selected from the group consisting of ammonia and basic compounds of alkali metals and alkaline earth metals.

5. The lapping operation set forth in claim 3 wherein the pseudo double salt of an alkyl orthophosphoric acid is the product of the neutralization of an acidic non-stoichiometric aluminum salt of alkyl orthophosphoric acid with sodium hydroxide.

6. A method for lapping surfaces comprising the steps of contacting a part surface and a lapping surface under low pressure abrading conditions and feeding to the contacting surfaces a gelled lapping composition comprising a liquid hydrocarbon having a Brookfield viscosity of less than about 200 cps. and a flash point above about 100° F., from about 0.1 to about 10% by weight based on liquid hydrocarbon of the pseudo double salt of an alkyl orthophosphoric acid as a gelling agent and from about 0.1 to about 20 lbs. of a lapping abrasive per gallon of liquid hydrocarbon.

7. The method of claim 6 wherein the pseudo double salt of an alkyl orthophosphoric acid is the product of the neutralization of an acidic non-stoichiometric aluminum salt of an alkyl orthophosphoric acid with a base selected from the group consisting of ammonia and basic compounds of alkali metals and alkaline earth metals.

* * * * *